(12) United States Patent
Nichols

(10) Patent No.: US 7,680,144 B2
(45) Date of Patent: Mar. 16, 2010

(54) DEVICE COUPLED BETWEEN SERIAL BUSSES USING BITWISE ARBITRATION

(75) Inventor: Steven C. Nichols, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 773 days.

(21) Appl. No.: 11/519,622

(22) Filed: Sep. 12, 2006

(65) Prior Publication Data

US 2008/0063006 A1 Mar. 13, 2008

(51) Int. Cl.
*H04L 12/54* (2006.01)
(52) U.S. Cl. .................. 370/451; 370/447; 370/462
(58) Field of Classification Search .............. 370/431, 370/433, 437, 445–451, 462
See application file for complete search history.

(56) References Cited

U.S. PATENT DOCUMENTS

| | | | |
|---|---|---|---|
| 4,654,889 A | 3/1987 | Shutterly | |
| 4,745,596 A | 5/1988 | Sata | |
| 4,785,453 A | 11/1988 | Chandran et al. | |
| 5,001,642 A | 3/1991 | Botzenhardt et al. | |
| 5,105,441 A | 4/1992 | Borst et al. | |
| 5,111,460 A | 5/1992 | Botzenhardt et al. | |
| 5,175,821 A | 12/1992 | Dutcher et al. | |
| 5,293,571 A | 3/1994 | Matsuda et al. | |
| 5,303,348 A | 4/1994 | Botzenhardt et al. | |
| 5,398,243 A | 3/1995 | Aguilhon et al. | |
| 5,499,247 A | 3/1996 | Matsuda et al. | |
| 5,617,545 A | 4/1997 | Ogata et al. | |
| 5,717,795 A | 2/1998 | Sharma et al. | |
| 5,740,353 A | 4/1998 | Kreulen et al. | |
| 5,805,614 A | 9/1998 | Norris | |
| 5,812,556 A | 9/1998 | Schmidt | |
| 5,854,454 A | 12/1998 | Upender et al. | |
| 5,856,976 A | 1/1999 | Hirano | |
| 5,903,565 A * | 5/1999 | Neuhaus et al. ............. | 370/402 |
| 6,111,673 A | 8/2000 | Chang et al. | |
| 6,167,057 A | 12/2000 | Kishigami et al. | |
| 6,353,775 B1 | 3/2002 | Nichols | |
| 6,373,376 B1 | 4/2002 | Adams et al. | |

(Continued)

FOREIGN PATENT DOCUMENTS

EP 1020784 7/2000

OTHER PUBLICATIONS

U.S. Appl. No. 11/223,278, filed Sep. 9, 2005, Nichols.

(Continued)

*Primary Examiner*—Ricky Ngo
*Assistant Examiner*—Pao Sinkantarakorn

(57) ABSTRACT

First and second serial data busses are arranged so that simultaneous transmission on the respective bus of a dominant state by one node and a recessive state by other nodes results in the dominant state being detectable on the respective bus. Transitions from a first state to a second state signal the start of a bit on the first bus. Dominant and recessive states are detected on the first and second busses at first and second predetermined times after each transition. The states represent respective dominant and recessive bits of attempted messages transmitted by nodes of the first and second busses. The dominant state is transmitted on both busses after the first and second predetermined times if the dominant state was detected on one of the first and the second busses at the first and second predetermined times.

18 Claims, 6 Drawing Sheets

U.S. PATENT DOCUMENTS 6,434,112 B1 8/2002 Kwon
2002/0146031 A1 10/2002 Nichols
2002/0172211 A1* 11/2002 Nichols .................. 370/412

OTHER PUBLICATIONS

Jul. 1, 1994, Jean-Lien C. Wu, et al., Practical Aspects and Experiences. A New Bus Contention Scheme in s/net with Dynamic Priority; Parallel Computing, Elsevier Publishers, Amsterdam, NL, vol. 20, No. 7, pp. 1045-1046, Jul. 1, 1994.

Dec. 15, 1997, P. Hank et al., SJA1000 Stand-Alone CAN Controller; Phillips, Appliciato note; Sections 2, 4.2, 5.2-5.4, year:1999.

D. John Oliver, "Implementing the J1850 Protocol", Intel Corporation, p. 1-15. http://www.intel.com/design/intarch/papers/j1850_wp.pdf, year:2001.

* cited by examiner

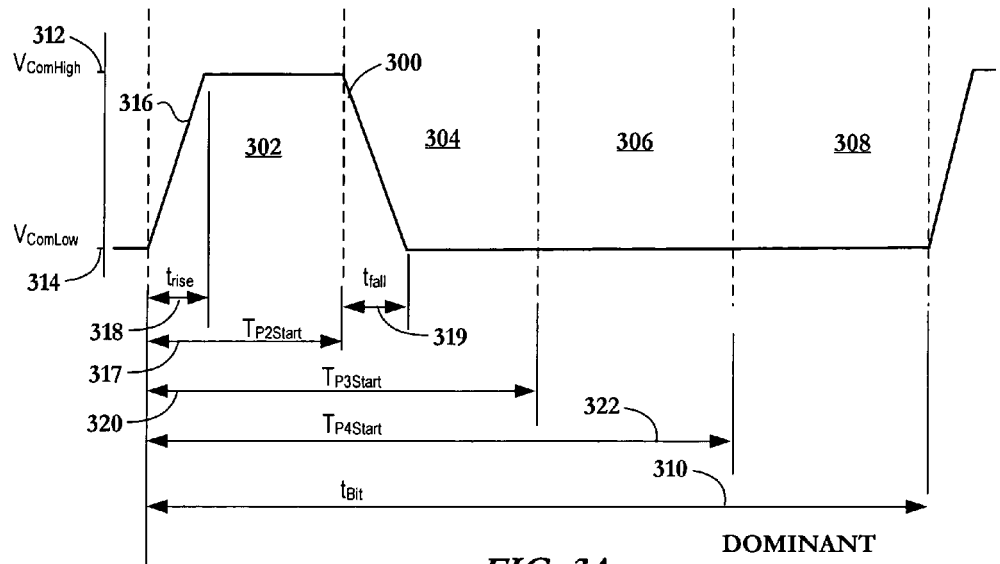
FIG. 3A DOMINANT BIT ENCODING
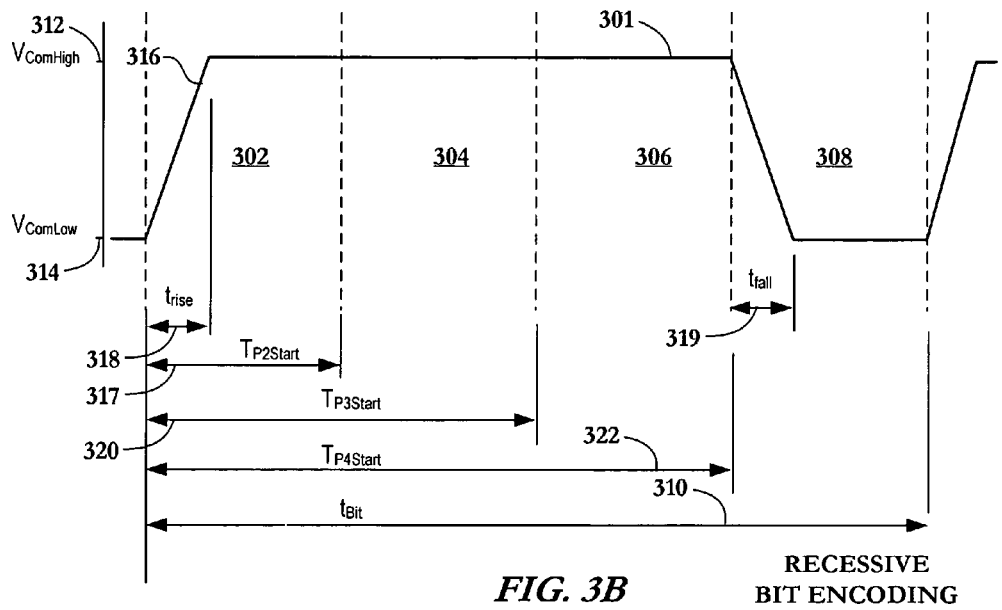
FIG. 3B RECESSIVE BIT ENCODING

DEVICE COUPLED BETWEEN SERIAL BUSSES USING BITWISE ARBITRATION

FIELD OF THE INVENTION

This invention relates in general to data communications, and in particular to arrangements using message sending nodes coupled via a serial bus.

BACKGROUND

The availability of small, low cost, and relatively powerful microprocessors has resulted in such processors being included in a variety of products. Previously, the higher cost of microprocessors meant they would be employed only for more complex tasks. However, a commodity market for cheap microprocessors has allowed these devices to be used as substitutes for conventional or special purpose circuits, often at equal or lower cost. At the same time, the device's processing power allows them to handle additional functions in a particular application that would be much more difficult to implement using conventional circuits.

In the fields such as distributed control and process management, the availability of cheap microprocessors allows more complex interactions between distributed devices. For example, there are numerous different electrical functions that are initiated at various places throughout an automated system. These functions may include activating mechanical devices, sensing physical quantities, accepting user inputs/controls, detecting system failures and improper states, etc. Conventional approaches require one or more conductors to be provided for each of these functions. For example, a separate wire may connect each temperature gauge in a system with an associated temperature sensor. In environments such as automotive and aerospace, where space and weight are at a premium, such wiring requirements can severely restrict the functionality that can be provided by conventional approaches.

By making use of the previously mentioned microprocessors, the number of conductors needed to provide inter-device communication is greatly reduced. Instead of dedicated wires between related components, a single wire may provide a serial signal path that is used for all inter-device communications. A power supply and return wire may also be connected to some or all of the components. Each device includes a communications node that can send messages to and receive messages from the other devices' nodes on the signal path. Each node receives every message on the signal wires and uses the messages appropriate for operating its associated device.

One problem using a single serial signal path is that of message collisions, where two or more nodes send messages on the signal wires at the same time. One solution to resolving message collisions is provided by the Controller Area Network (CAN) system, which uses bit-wise arbitration. In the CAN system, messages are encoded using signals that represent either dominant or recessive bits. If a communicator sends a dominant bit signal, the dominant bit is present on the signal path regardless of the number of other communicators that are sending recessive bits. Each communicator senses the signal on the signal path, and ceases sending its message if, when sending a recessive bit, the node senses a dominant bit. This process of detecting collisions at each node and ceasing sending messages upon detecting of collisions is referred to as arbitration.

The leading bits of a message in a CAN-type system act inherently as a priority during arbitration. Messages that have the largest sequence of dominant leading bits will win arbitration over other simultaneously transmitted messages. Therefore, the system designer can ensure messages have the desired priority by forming messages having a particular ordering of leading bits in relation to other messages transmitted on the system.

In order to synchronize nodes on a CAN-type system, each receiving node must adjust its internal timers with each received bit so that the receiving nodes stay synchronized with the transmitting nodes. However, it was recognized that for low data-rate systems, such an elaborate synchronization mechanism could be avoided if a commonly accessible timing signal could be used to synchronize the nodes.

For example, in ENVIRACOM® systems provided by Honeywell® International Inc., each bit transmitted on the serial line is synchronized to a half cycle of AC power. Where the AC line frequency is 60 Hz or 50 Hz, this provides data rates of 120 bits per second or 100 bits per second, respectively. Because ENVIRACOM is primarily intended for use in residential Heating, Ventilation, and Air Conditioning (HVAC) systems, these low data rates are not an impediment to providing useful system controls. This simplified method of synchronizing control/sensing nodes allows creating relatively sophisticated HVAC systems using legacy thermostat wiring and relatively low-cost HVAC components.

However, as systems become more complicated, the need for higher data rate bus speeds in ENVRACOM-type systems is becoming apparent. However, such systems need to retain backwards-compatibility with previous devices whose data rates are synchronized to the power line frequency. Such systems should also retain compatibility with the higher layers of the message-exchange protocols so that previously designed application software can be reused with the higher data rate systems.

SUMMARY

The present disclosure relates to data communications between two or more serial data busses. In one embodiment, a method of communicating between first and second serial data busses is described. Each bus includes one or more nodes coupled via the respective data bus so that simultaneous transmission on the respective bus of a dominant state by at least one of the nodes and a recessive state by the other nodes results in the dominant state being detectable on the respective bus. The method involves transmitting transitions from a first state to a second state onto the first bus. The first and second states are complementary states selected from the dominant and recessive states. Each of the transitions signal the start of a bit on the first bus. Dominant and recessive states are detected on the first bus at a first predetermined time after each transition and on the second bus at a second predetermined time after each transition. The states represent respective dominant and recessive bits of attempted messages transmitted by nodes of the first and second busses. The dominant state is transmitted on both the first and second bus after the first and second predetermined times if the dominant state was detected on at least one of the first bus and the second bus at the respective first and second predetermined times.

In more particular embodiments, the method further involves ceasing transmission of bits onto the first and second busses by any of nodes of the first and second busses that were transmitting a recessive bit after the respective first and second predetermined times and detected a dominant bit after the respective first and second predetermined times. In one particular embodiment, the method further involves transmitting the transition onto the second bus substantially simultaneously with the transmission of transitions onto the first bus. In such an arrangement, detecting the dominant and recessive states on the first and second busses at the first and second predetermined times after each transition involves detecting the dominant and recessive states on the first and second bus at a time that is substantially less than a predetermined time after the transition that nodes of the first and second busses use to respectively detect the state of the first and second busses.

In other, more particular embodiments, the method further involves detecting a synchronization signal of the second bus from an AC power signal of the second bus. In such an arrangement, detecting the synchronization signal of the second bus from the AC power signal of the second bus may involve detecting the synchronization signal based on zero crossings of the AC power signal. The transmission of the transition onto the first bus may be in response to the synchronization signal of the second bus, in which case the transmission of the transition onto the first bus synchronized with the synchronization signal of the second bus may cause bits to be transmitted onto the first bus at a substantially slower rate than a maximum bit rate of nodes of the first bus.

In other, more particular embodiments, detecting the dominant and recessive states on the first bus at the first predetermined time after each transition involves detecting the dominant and recessive states on the first bus at a time that is substantially less than a predetermined time after the transition that nodes of the first bus use to detect the state of the first bus. In some arrangements, detecting the dominant and recessive states on the second bus at the second predetermined time after each transition may involve detecting the dominant and recessive states on the second bus at a time that is substantially less than a predetermined time after the transition that nodes of the second bus use to detect the state of the second bus.

In another embodiment of the invention, an apparatus is operable in a data processing arrangement that includes first and second serial data busses. Each bus has one or more nodes coupled via the respective data bus so that simultaneous transmission on the respective bus of a dominant state by at least one of the nodes and a recessive state by the other nodes results in the dominant state being detectable on the respective bus. The apparatus includes a first transceiver coupled to the first bus and capable of transmitting and receiving the dominant and recessive states via the first bus. A second transceiver of the apparatus is coupled to the second bus and capable of transmitting and receiving the dominant and recessive states via the second bus. The apparatus includes a processor coupled to the first and second transceivers. A memory is coupled to the processor and has instructions that cause the processor to transmit, via the first transceiver, repeated transitions from a first state to a second state on the first bus. The first and second states are complementary states selected from the dominant and recessive states. The processor detects via the first transceiver dominant and recessive states on the first bus at a first predetermined time after each transition, and detects via the second transceiver dominant and recessive states on the second bus at a second predetermined time after each transition. The processor transmits the dominant state on both the first and second bus after the first and second predetermined times if the dominant state was detected on either the first bus or the second bus at respective first and second predetermined times.

In more particular embodiments, apparatus further includes a synchronization detector coupled to an alternating current (AC) power line of the second bus. The synchronization detector provides a synchronization signal proportional to the frequency of the AC power line. The synchronization signal signals the beginning of bit transmissions onto the second bus. In one such arrangement, the processor causes the first transceiver to transmit the transitions onto the first bus in response to the synchronization signal of the second bus. In another such arrangement, the transmission of the transition onto the first bus in response to the synchronization signal of the second bus causes bits to be transmitted onto the first bus at a substantially slower rate than a maximum bit rate of nodes of the first bus. In one configuration, the synchronization detector provides the synchronization signal based on zero crossings of a voltage signal of the of the AC power line.

In other, more particular embodiments, the first predetermined time is substantially less than a predetermined time after the transition that nodes of the first bus use to detect the state of the first bus and/or the second predetermined time is substantially less than a predetermined time after the transition that nodes of the second bus use to detect the state of the second bus.

In another embodiment, a system includes a first and second serial bus. A first and second plurality of nodes are respectively coupled via the first and second serial busses so that simultaneous transmission on the respective bus of a dominant state by one of the nodes and a recessive state by any other of the nodes results in the dominant state being detectable on the respective bus. An apparatus is coupled to the first and second busses. The apparatus includes: means for transmitting repeated transitions from a first state to a second state on the first bus, wherein the first and second states are complementary states selected from the dominant and recessive states; means for detecting dominant and recessive states on the first bus at a first predetermined time after each transition; means for detecting dominant and recessive states on the second bus at a second predetermined time after each transition; and means for transmitting the dominant state on both the first and second bus after the first and second predetermined times if the dominant state was detected on either the first bus or the second bus at respective first and second predetermined times.

In another embodiment, a processor-readable medium includes a program storage medium configured with instructions for use by a device coupled to first and second serial data busses, each bus comprising one or more nodes coupled via the respective data bus so that simultaneous transmission on the respective bus of a dominant state by at least one of the nodes and a recessive state by the other nodes results in the dominant state being detectable on the respective bus, the instructions causing the a processor of the device to perform the operations that include: transmitting repeated transitions from a first state to a second state on the first bus, wherein the first and second states are complementary states selected from the dominant and recessive states; detecting dominant and recessive states on the first bus at a first predetermined time after each transition; detecting dominant and recessive states on the second bus at a second predetermined time after each transition; and transmitting the dominant state on both the first and second bus after the first and second predetermined times if the dominant state was detected on either the first bus or the second bus at respective first and second predetermined times.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

FIG. 3A is a signal diagram illustrating the transmission of a dominant bit on a node-synchronized bus according to embodiments of the present invention;

FIG. 3B is a signal diagram illustrating the transmission of a recessive bit on a node-synchronized bus according to embodiments of the present invention;

DETAILED DESCRIPTION

Figure 1:
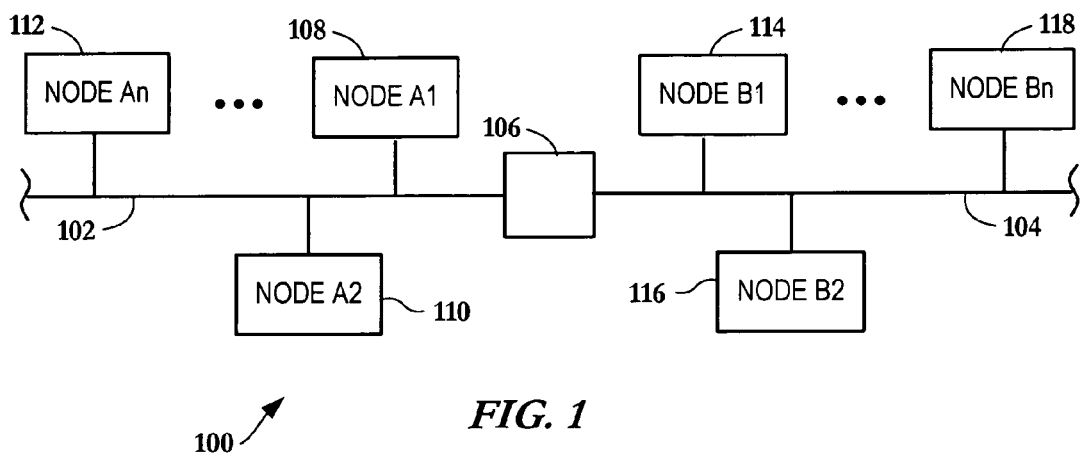
FIG. 1 is a diagram showing an arrangement of serial busses that are coupled by a bridging device according to embodiments of the present invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention involves communicating messages between data processing nodes via a common data path or bus. The data path is generally a serial data bus coupled to each of the nodes. Communications on the data path utilize non-destructive bitwise arbitration for dealing with contention. This arbitration utilizes dominant and recessive states (e.g., voltages) on the common data path.

In non-destructive arbitration, the state of the common data path at any given time will transition between two complementary states, the dominant and recessive state. When at least one node transmits a dominant state and other nodes transmit a recessive state, the dominant state will be seen on the data path by all nodes. Each transmitting node monitors the bus, and any nodes that transmit a recessive state but detect a dominant state on the bus have lost arbitration to another node. Thereafter, nodes that have lost arbitration go into a listening mode and wait for another opportunity to retransmit.

One advantage of non-destructive arbitration is that nodes sending the highest priority messages can transmit without interruption or retransmission of already transmitted bits. The priority of each message is determined by the arrangement of bits in the message. Messages having more dominant bits at the beginning of the message will generally win arbitration. This allows flexibility in system design. Any node can take advantage of both low and high priority transmission based on the urgency of each particular message. The message contents contain an inherent priority in the leading bits, therefore the nodes need not include additional logic to determine priority for any given event. Priorities can be predetermined by the system designer in the definition of system messages.

Nodes utilizing non-destructive bitwise arbitration typically transmit onto a single data path, or bus. The electrical characteristics of the bus are determinative of many system limitations, including maximum bus length, maximum data rate, bus currents and voltages, maximum number of nodes that may be attached, etc. In simple systems, a single bus may be sufficient to meet all of the designer's needs. However, in more complex systems, it may be advantageous to allow data transfer between two electrically independent busses, such as by coupling a bridging device between the busses. The coupled busses may utilize the same or different protocols.

A bridging device that can span two busses, therefore, may serve multiple purposes, including translating between two different bus configurations, and extending an existing bus for purposes such as increasing effective bus length or increasing the allowable nodes intercommunicating in the system. In the former case, the device is performing functions usually associated with a network bridge, e.g., connecting busses that utilize disparate or incompatible standards. In the latter case, the device acts as a repeater, extending the number of nodes and/or bus distance that can be used for a particular bus standard.

In reference now to FIG. 1, an arrangement 100 is illustrated that includes serial busses 102, 104 coupled by a bridging device 106 according to embodiments of the present invention. Nodes 108, 110, and 112 are coupled to bus 102, and nodes 114, 116, and 118 are couple to bus 104. It will be appreciated that any number of nodes may be coupled in the arrangement, usually limited based on physical characteristics of the busses 102, 104. For example, where the busses 102, 104 includes one or more electrical conductors, the maximum number of nodes may depend on maximum allowable current, line capacitance, propagation delays, reflections, etc.

The nodes 108, 110, 112, 114, 116, and 118 generally include electrical and data processing characteristics that allow intercommunication between entities on the respective bus. The nodes 108, 110, 112, 114, 116, and 118 may be configured to provide functionality of any device known in the art, including sensors, controllers, transducers, power supplies, computers, switches, gateways, repeaters, converters, bridges, etc. In one application, the 108, 110, 112, 114, 116, and 118 are part of a commercial or residential heating, ventilation, and air conditioning system (HVAC).

The busses 102, 104 may include any known topography, including ring, star, daisy chain, linear, stubs, or any combination thereof. The busses 102, 104 may include any combination of signal, power and ground/return lines. Generally the busses 102, 104 described herein will be electrical conductors, but it will be appreciated that some or all of the bus concepts described herein may be applicable to any common data carrier medium, such as fiber optic and wireless technologies.

Generally, the busses 102, 104 will have electrical characteristics that are appropriate for the devices directly coupled to the bus, and the respective nodes 108, 110, 112, 114, 116, and 118 of the busses 102, 104 will utilize compatible communications protocols. Thus the bridging device 106 will also be compatible with the respective bus 102, 104 to which it is coupled. The busses 102, 104 may have different characteristics and protocols, or may be substantially compatible. In the former case, the bridging device 106 acts as a bridge connecting incompatible network segments. Where the busses 102, 104 are compatible the bridging device 106 may be acting as a repeater. For example, the use of the bridging device 106 as a repeater may allow the busses 102, 104 to extend across physical distances that would normally be prohibited due to capacitive/resistive loading, latencies, and similar effects that become problematic over long distances. A repeater 106 may also allow increasing the number of total nodes of the system 100 where the number of nodes would normally be limited by capacitive/resistive loading or similar effect There are two particular bus arrangements that are discussed in accordance with embodiments of the invention. The two types of bus arrangements differ in the method of synchronizing bits between nodes. The first type of system, referred to herein as "AC-synchronized" and used by ENVIRACOM™ systems provided by Honeywell International Inc., zero crossings of AC power at the nodes are used to signal the start of each bit. The data rate supported the AC-synchronized system is typically a multiple of line frequency. In ENVIRACOM™ systems using a 60 Hz AC power source, a 120 bps bit rate is obtained. A more complete description of the AC-synchronized arrangement is described in U.S. Pat. No. 6,373,376 entitled "HIGH LEVEL MESSAGE PRIORITY ASSIGNMENT BY A PLURALITY OF MESSAGE-SENDING NODES SHARING A SIGNAL BUS," having a common assignee with this application, which is hereby incorporated by reference in its entirety (hereinafter referred to as the "AC-Synchronization" reference).

In the second bus arrangement, one arbitrarily selected node on the bus puts out a signal used to synchronize the transmission of bits by all of the nodes on the bus. This second arrangement is referred to herein as "node-synchronized," and is used by the FAST ENVIRACOM™ systems provided by Honeywell International Inc. A more complete description of the node-synchronized arrangement is described in U.S. patent application Ser. No. 11/223,278 filed on Sep. 9, 2005, entitled "BITWISE ARBITRATION ON A SERIAL BUS USING ARBITRARILY SELECTED NODES FOR BIT SYNCHRONIZATION," having a common assignee with this application, which is hereby incorporated by reference in its entirety (hereinafter referred to as the "Node-Synchronization" reference).

A bridging device 106 according to embodiments of the invention may have at least two configurations. In one configuration, the busses 102, 104 utilize the same synchronization, e.g., both busses 102, 104 are either both AC-synchronized or both busses 102, 104 are node-synchronized. In such a configuration, the bridging device acts as a repeater that may be used to extend the total effective bus length of the arrangement 100. In another configuration, one of the busses 102, 104 is AC-synchronized, and the other is node-synchronized. In this configuration, the bridging device acts as a network bridge. In either configuration, the bridging device 106 detects the state of both busses 102, 104 and if either side is in a dominant state, the bridging device sets the other side to be in a dominant state. In order to ensure timing of bits between the busses 102, 104 remains within specification, the bridging device 106 will generally detect state transition (e.g., dominant-to-recessive, and recessive-to-dominant) earlier than required by the official specification in order to timely assert the correct states on both busses.

Figure 2:
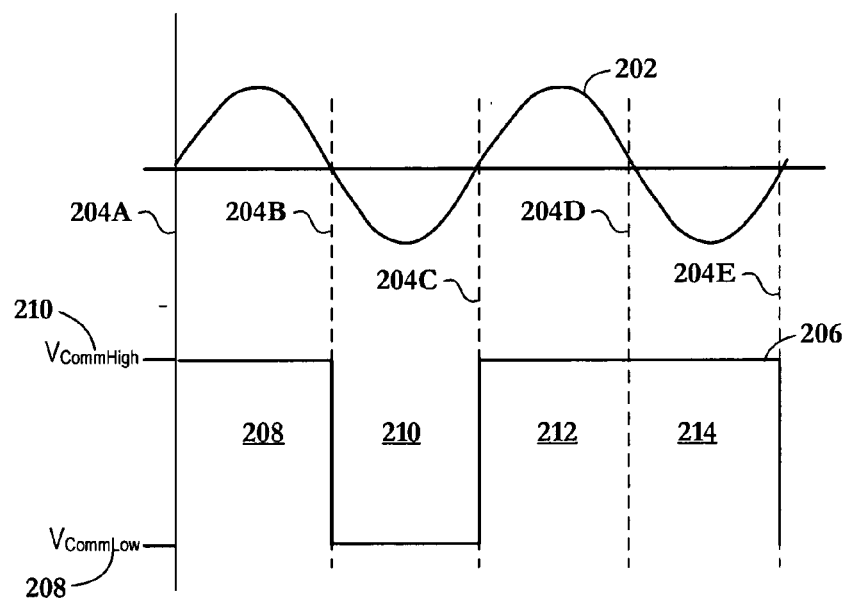
FIG. 2 is a signal diagram illustrating AC power bit-synchronization according to embodiments of the present invention.

In reference now to FIG. 2, an example of AC-synchronized bus operation according to an embodiment of the invention is illustrated. An AC waveform 202 is used to synchronize the transmission of bits onto the bus. Zero-crossings of this waveform, as represented by vertical lines 204A-E, are detected and used to signal the start of each bit in the signal waveform 206. The signal waveform 206 is transmitted onto a single line that is commonly read from and transmitted to by all nodes on the bus.

In the embodiments presented herein, two bus voltage are described, "CommLow" 208 and "CommHigh" 210. In this example, the CommLow 208 and CommHigh 210 voltages respectively represent the dominant and recessive states on the bus. CommHigh 210 represents a relatively high voltage, and CommLow 208, represents a relatively low voltage. It will be appreciated that the nodes only need make determinations of dominant and recessive states based on the relative higher value of CommHigh 210 as compared to CommLow 208; the actual potential/voltage of CommLow 208 and CommHigh 210 may assume any values useful to the system designer as long as the potential difference between CommLow 208 and CommHigh 210 is maintained.

During simultaneous transmission of CommHigh 210 and CommLow 208 by different devices, the resulting value detected on the data line is CommLow 208. Thus, CommLow 208 is said to be the dominant state on the bus. However, those skilled in the art will appreciate that the invention may be equally applicable to systems where higher voltages represent the dominant state and lower voltages represent the recessive state.

The value of each bit on the bus is determined by the value of the voltage during the between two zero crossings 204A-E of the AC waveform 202. The voltage can be averaged or otherwise processed in order to remove the effects of noise or other line effects during the period. Generally, the bit will be considered dominant if the measure voltage during each period is less than a threshold value, and is considered recessive if the average voltage during the period exceeds a threshold value. In the illustrated waveform 206, the bit for periods 208, 212, and 214 are recessive (zero) and the bit for period 210 is dominant (one). Thus a node reading the illustrated signal 206 will interpret the signal as a binary 0100.

An example of bit encoding on a node-synchronized serial data bus according to embodiments of the present invention is shown in FIG. 3A. FIG. 3A shows an example waveform 300 for encoding a single bit, in particular a dominant bit. As in the AC-synchronized implementation, a dominant bit represents a logical one, and a recessive bit represents a logical zero.

The waveform 300 is subdivided into four periods 302, 304, 306, and 308. If the period of the waveform 300 is at or near the minimum time value (and thus the maximum bit-rate) that the system is designed to support, the four periods 302, 304, 306, and 308 are of substantially similar duration. At lower bit-rates, the fourth period 308 may be much larger than the others. The minimum time required to transmit a single bit is shown as $t_{Bit}$ 310. Although ideally the waveform 300 will have a period near $t_{Bit}$, the system may still operate at bit periods that are much larger than $t_{Bit}$. For example, the bit-rate may be slowed down to ensure backwards compatibility with slower devices.

The waveform 300 in FIG. 3A encodes a dominant (one) bit. A recessive bit waveform 301 is shown in FIG. 3B. During simultaneous transmission of a dominant and recessive bit by different devices, the resulting value registered at the data link layer by all devices is a dominant bit. The state of the data line detected during period 306 determines whether a dominant or recessive bit is detected. There is no gap required between bits.

Of all the nodes connected to the data line of a node-synchronized bus, an arbitrary node is automatically chosen as the Bit Master. The Bit Master generates the transition 316 that designates the start of a bit to all non-Bit Masters, thereby synchronizing the bit timing for all other devices. In the illustrated waveforms 300, 301, the transition 316 appears as a positive edge. The transition 316 is created by the Bit Master using its major pull-up current to assert CommHigh 312 on the Com line. Thus, during the transition 316, the Com line goes from a dominant signal state (e.g., CommLow 314) to a recessive signal state (e.g., CommHigh 312). The term "positive edge" may also be used herein to refer to the transition 316.

The transition 316 preferably occurs within a predefined minimum rise time 318. In this example, the minimum rise time is 25 microseconds, and is established to prevent the transmission of radio frequency interference on the Com line. The rise time 318 must not exceed a maximum value either, as the devices must detect the assertion of CommHigh in a predefined window (e.g., for the time $T_{P2start}$ 317) within the first period 302. For similar reasons, a fall time 319 is used to define an acceptable range of values for negative edges occurring within the waveforms 300, 301.

In order to account for line noise, nodes will need to filter both positive and negative edges when attempting to detect waveforms such as 300, 301. In one example, positive and negative edges can be filtered by continuously sampling the line at close intervals to ensure detected transitions are not anomalous. In the present examples, filtering involves continuously sampling the line with no more than 3 μSec between samples until either 15 μSec of the same consecutive value occurs or 30 μSec occurs. The last sampled value indicates be the filtered state of the line. If the filtered state does not change value, the edge can be ignored.

At the start of the second period 304, any device sending a dominant bit pulls the Comm line low, as is shown in FIG. 3A. Otherwise, devices transmitting a recessive bit let the line stay high in period 302 as shown in FIG. 3B. Each device receives the dominant/recessive state of the bit by detecting the state of the Com line at the start of the third period 306, as indicated by time $t_{P3Start}$ 320. A value of CommLow detected at $t_{P3Start}$ 320 indicates a dominant bit (logical 1) as shown in FIG. 3A, while a high value indicates a recessive bit (logical 0) as shown in FIG. 3B.

When the Bit Master sees a dominant state at the start of the third period 306 (i.e., $t_{P3Start}$ 320), the Bit Master pulls the line low even if it is trying to send a recessive bit. At the beginning of the fourth period 308 (i.e., at time $t_{P4Start}$ 322), all devices except for the Bit Master release the line without using their major pull-up current. If the Bit Master isn't already pulling the line low (because all devices are sending a recessive bit), it pulls the line low at $t_{P4Start}$ 322. If a dominant bit was sent, the Bit Master continues to hold the line low through the fourth period 308. At the end of the bit, only the Bit Master is pulling the line low and will not have interference from other devices when it uses its major pull-up current at the start of the next bit.

A more complete description of the bus arbitration mechanisms of the node-synchronized bus is provided in the Node-Synchronization reference. One feature of the node-synchronized bus is that the Bit Master may slow down the transmission of bits onto the bus. In reference again to FIGS. 3A and 3B, the Bit Master may delay sending the transition 316 that signals the start of the bit for a certain amount of time after the end of the previously transmitted bit. If no nodes detect this transition 316 for a predefined time period, one of the other nodes will arbitrarily begin transmitting the transition 316, thus taking over the role as Bit Master. However, this predetermined time is selected so that the bus can be slowed down to speeds that are compatible with the older, AC-synchronized bus arrangement, such as described in relation to FIG. 2. This allows new devices on the faster, node-synchronized bus to be made compatible with the slower, AC-synchronized bus.

Figure 4A:
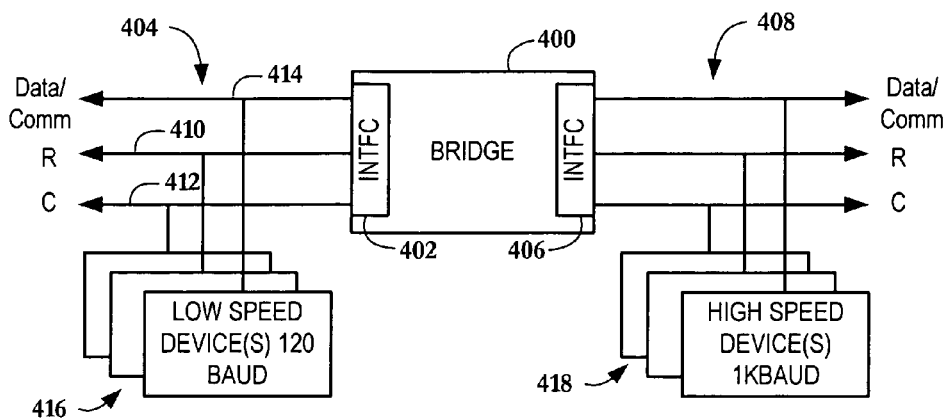
FIG. 4A is a block diagram illustrating a bridging device according to embodiments of the present invention.

In order to share AC- and node-synchronized devices on the same system, a device is used to bridge the two types of busses. A bridge 400 according to an embodiment of the invention is shown in the block diagram of FIG. 4A. Generally, the bridge 400 includes an interface 402 for communicating via an AC-synchronized bus 404 and an interface 406 for communicating via a node synchronized bus 408. The busses 404, 408 in this example include the same physical configuration, both having R and C lines (e.g., lines 410, 412 on bus 402) that are respective power and return lines from a transformer (not shown). Bits are transmitted on the data line (e.g., line 414 on bus 402), which is also referred to as Comm line. The C line 410 can serve as a current return path for the data line 414.

Devices 416, 418 on both sides of the bridge 400 (as well as the bridge 400 itself) get system power from the system transformer, which can be on either side of the bridge 400. No configuration should be needed to identify which side of the bridge 400 contains the system transformer. However there is preferably only one system transformer. In addition there is preferably only one bridge device 400 for the system transformer. When the bridge 400 is installed, it slows down the high speed, node synchronized devices 418 to match the slower baud rate of 120 bits/sec of the AC-synchronized devices 416. Therefore the bridge 400 may not accommodate node synchronized devices 418 and related systems that depend on message traffic above 120 bits per second.

Figure 4B:
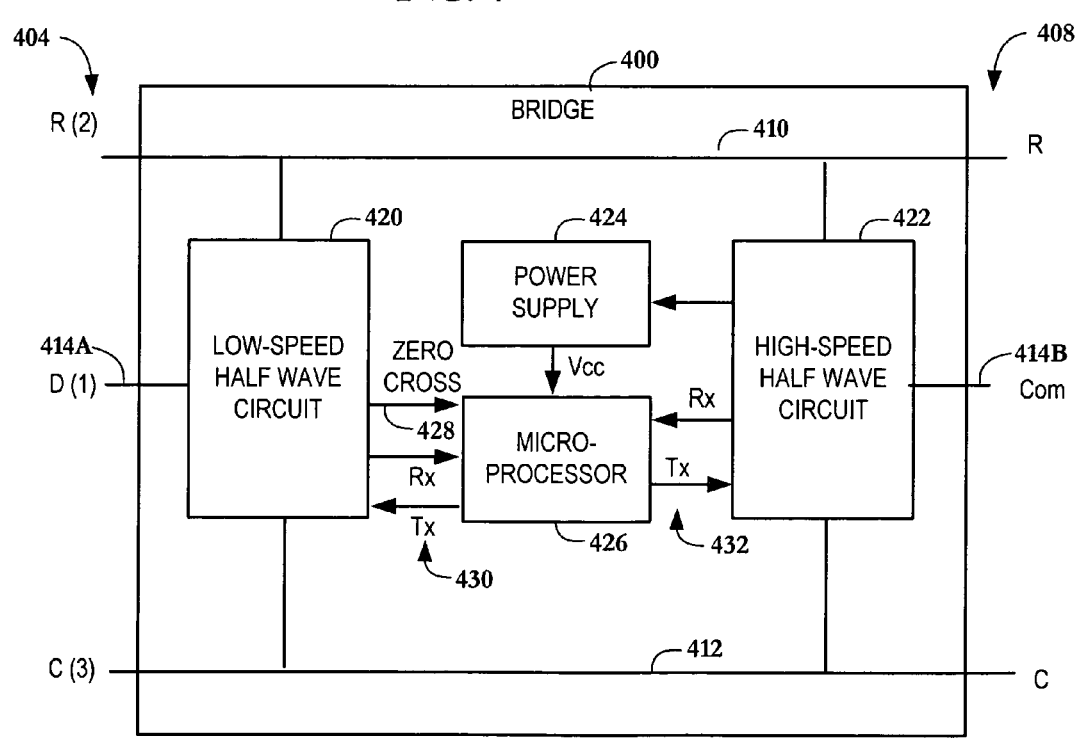
FIG. 4B is a block diagram illustrating internal components of a bridging device according to embodiments of the present invention.

The internal design of the bridge 400 according to an embodiment of the invention is shown in the block diagram of FIG. 4B. Portions of FIG. 4B use the same reference numerals to denote corresponding elements shown in FIG. 4A, and the descriptions thereof will be omitted. Generally, the internal components of the bridge 400 couples the physical layers of the corresponding bus architectures without implementing the data link and higher layers.

The bridge 400 includes half-wave circuits 420, 422 for respective low-speed and high speed busses 404, 408. These half-wave circuits 420, 422 are used to provide one or more inputs to a power supply 424, which in turn powers a microprocessor 426. The half-wave circuits 420, 422 generally provide rectification of the AC transformer power received via the R and C lines 410, 412, as well as providing miswiring protection and signal conditioning of the data lines 414A, 414B. In particular, the half-wave circuits 420, 422 include circuitry that enforces the dominant/recessive behavior of the respective busses 404, 408. In addition, the low-speed half-wave circuit 420 also has zero crossing detect circuitry for bit synchronization, as indicated by signal 428. It will be appreciated that different circuits could be used to provide the functions of the half-wave circuits 420, 422. For example, the Node Synchronization reference describes examples of full-wave circuitry used to accomplish these functions.

The microprocessor 426 monitors the zero cross input 428 from the low speed side 420 and determines when a zero cross occurs by detecting a change in the zero cross input level. The microprocessor 426 also determines whether the zero cross 428 is the start of a positive or negative cycle by examining the state of the zero cross input 428. If the state is high, then it is the start of a positive half cycle. Likewise if the state is low, then it is the start of a negative half cycle.

The microprocessor 426 samples and asserts bus states (e.g., voltages) via the low-speed and high-speed circuits 420, 422, as indicated by respective low-speed and high-speed data paths 430, 432. These data paths 430, 432 are also referred to herein as the low-speed and high-speed "sides" of the bridge 400, although this reference is only an abstraction from the view of the microprocessor 426, and not necessarily reflective of a particular circuitry arrangement within the bridge 400.

The microprocessor 426 forces itself to be the bit master on the high-speed side 432 by creating a positive edge only when a zero cross plus delay occurs on the low-speed bus 404, instead of asserting the positive edge at the normal high speed bit time ($t_{Bit}$). For positive half cycles, this delay is about 1.67 mSec. For negative half cycles, the delay is about 1.95 mSec. Because bits on the high speed bus 408 are triggered by the bridge 400 only when zero crosses occur, bits on the high speed bus 408 will have large gaps between them and will occur on the at a 120 Hz rate instead of 1 KHz. For the bridge device 400, the following parameters shown in Table 1 deviate from node-synchronized devices as specified in the Node Synchronization reference.

both sides 430, 432 of the bridge 400 are recessive and see dominant if either side 430, 432 of the bridge 400 is dominant.

The specific values of delays as shown in Table 1 will be dependent on the requirements and specification of end system in which the invention is utilized. An illustration of how the delay values were calculated for these particular embodiments may be useful. For the value of $t_{P3Start}$, the bridge needs to start sampling the Comm line 414B after other devices have set the dominant/recessive state of the line but while still allowing the bridge 400 enough time to set the state of the Comm line 414B before other devices start sampling the line. Therefore, the minimum value is $t_{P2Fallmax}$=338 uSec. The maximum value is $t_{P3Start}$ min=475 uSec. Thus, a value toward the middle of these two limits was chosen: 400 uSec.

To calculate the low-speed bus delay after zero cross, two situations must be taken into account, positive and negative cycles of the AC line. For a positive cycle, the minimum time from an actual zero cross before detecting the zero cross is 0.63 mSec. For a negative cycle, the minimum time from the actual zero cross before detecting the zero cross is 0.35 mSec. The time from an actual zero cross to the maximum time before the D line 414A is valid is 2.7 mSec. So on the positive cycle, the bridge 400 will need to wait 2.7−0.63=2.07 mSec from the detected zero cross before sampling the data. Because the bridge 400 samples the data $t_{SampleQ2}$ after the positive edge on the high-speed side 432, the positive edge

TABLE 1

Variations of bridge parameters from node-synchronization specification

| Parameter | Description | Min | Max | Units |
|---|---|---|---|---|
| $t_{Bit}$ | Time between creating positive edges by the bit master | On low-speed bus zero cross | On low-speed bus zero cross | |
| $t_{P3Start}$ | Time from a positive edge to sampling the state of the bit. | 400 | 425 | μSec |
| $t_{BitMasterTimeout}$ | Time without detecting a $V_{CommLow}$ state before becoming the bit master | Always the bit master | Always the bit master | |

While the high speed side 432 is being sampled, the state of the low speed side 430 of the bridge 400 is being determined: At the same time that sub-sampling is occurring on the high-speed side 432 at tSampleQ2, the low-speed side 430 is also sub-sampled and the dominant/recessive state is determined based on a majority of the sub-samples. In one embodiment, three sub-samples are used, and the dominant/recessive state is determined based on the sampled value of at least two of the states being the same state.

From the received state on both the low-speed and high-speed sides 430, 432, the transmit for the remainder of the respective bits are shown in the following table:

TABLE 2

Bridge transmit bits based on received bits

| Low Speed Rx | High Speed Rx | Low Speed Tx | High Speed Tx |
|---|---|---|---|
| recessive | recessive | recessive | recessive |
| recessive | dominant | dominant | dominant |
| dominant | recessive | dominant | dominant |
| dominant | dominant | dominant | dominant |

Because the bridge 400 sets the state of its transmit bit sufficiently early for bits on both sides 430, 432 of the bridge, devices on either side of the bridge 400 will see recessive if must be 2.07−$t_{SampleQ2}$ min=2.07−0.400=1.67 mSec after the detected zero cross. For a negative cycle the delay must be (2.7−0.35)−0.400=1.95 mSec.

Figure 5A:
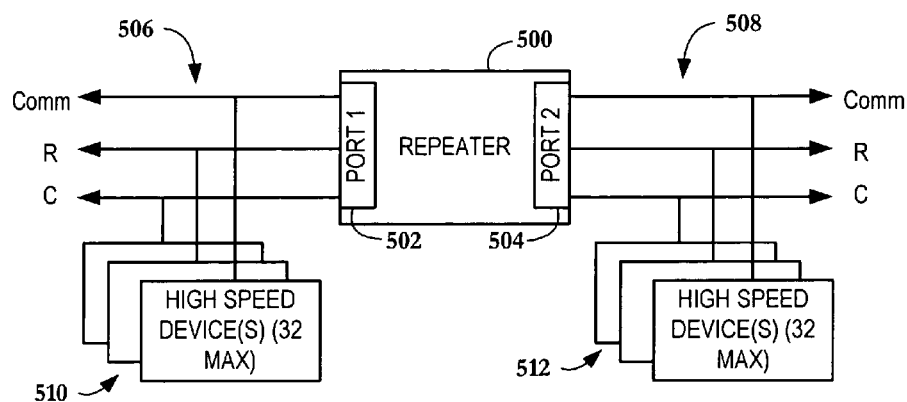
FIG. 5A is a block diagram illustrating a repeater device according to embodiments of the present invention.

Another type of bridging device that may be used in systems according to embodiments of the present invention is a repeater 500 as shown in the block diagram of FIG. 5A. The repeater 500 includes two interfaces, port 1 502 and port 2 504 for the respective busses 506, 508. In this example, the busses 506, 508 are configured for high-speed operation of the node-synchronized bus, as indicated by devices 510, 512. In this configuration, the repeater 500 can be used to double the maximum allowed number of nodes from 32 to 64. Preferably, only one repeater is used on each system transformer (not shown) for HVAC systems.

Devices 510, 512 on both sides of the repeater 500 (as well as the repeater 500 itself) get system power from the system transformer, which can be on either side of the repeater 500. No configuration is needed to identify which side of the repeater 500 contains the system transformer, however there is preferably only one system transformer.

Figure 5B:
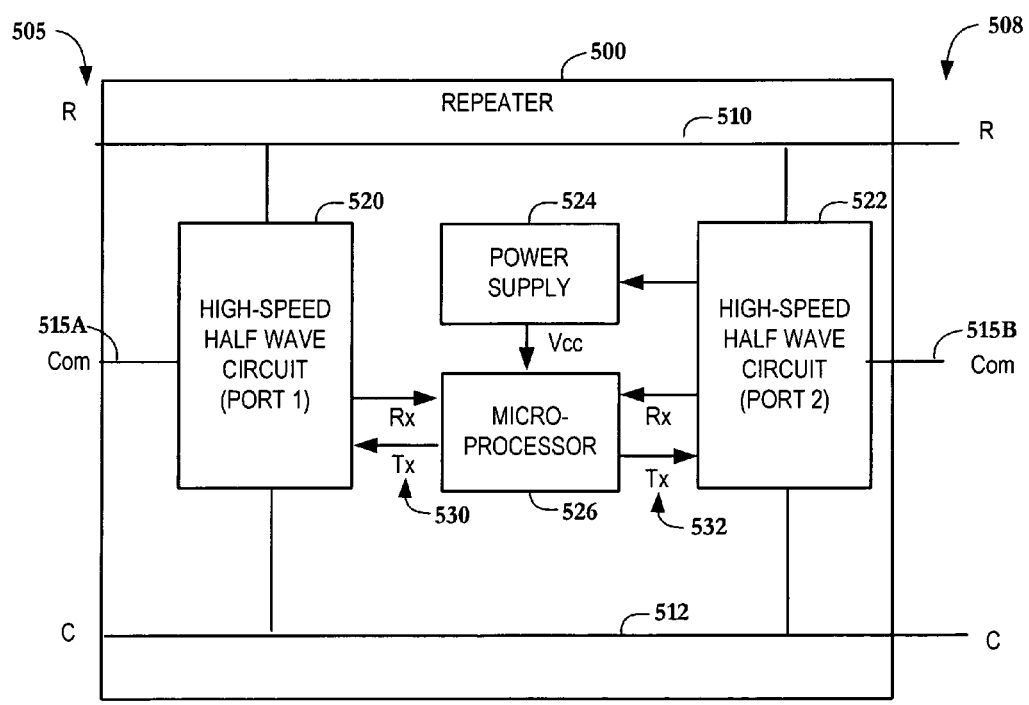
FIG. 5B is a block diagram illustrating internal components of a repeater device according to embodiments of the present invention.

One internal arrangement of the bridge is shown in FIG. 5B, Internally, the bridge 500 may be designed as shown in the block diagram of FIG. 5B, which uses the same reference numerals to denote corresponding elements shown in FIG. 5A. Generally, the repeater 500 includes half-wave circuits 520, 522 for high-speed busses 506, 508 on ports 1 and 2. These half-wave circuits 520, 522 inputs to a power supply 524, which in turn powers a microprocessor 526. The half-wave circuits 520, 522 generally provide rectification of the AC transformer power received via the busses 506, 508, provide mis-wiring protection, signal conditioning, and enforcement of dominant/recessive behavior of the data lines 528, 530. It will be appreciated that different circuits could be used to provide the functions of the half-wave circuits 520, 522. For example, the Node Synchronization reference describes examples of full-wave circuitry to accomplish these functions.

When the repeater 500 is installed, it forces itself to be the bus master by generating simultaneous negative edges on both busses 506, 508 every $t_{Bit}$. Table 3 below shows other parameters of the repeater device 500 that deviate from the Node Synchronization specification. The specific values of delays as shown in Table 3 may be different depending on the requirements and specification of the particular end system in which the invention is utilized. A discussion of how these particular values were derived is provided in relation to Table 1 above.

TABLE 3

Variations of repeater from node-synchronization standard

| Parameter | Description | Min | Max | Units |
|---|---|---|---|---|
| $t_{P3Start}$ | Time from a positive edge to sampling the state of the bit. | 400 | 425 | uSec |
| $t_{BitMasterTimeout}$ | Time without detecting a $V_{CommLow}$ state before becoming the bit master | Always the bit master | Always the bit master | |

From the received state on both ports of the repeater 500, the transmit states for the remainder of the respective bits are shown in Table 4.

TABLE 4

Repeater transmit bits based on received bits

| Port 1 Rx | Port 2 Rx | Port 1 Tx | Port 2 Tx |
|---|---|---|---|
| recessive | recessive | recessive | recessive |
| recessive | dominant | dominant | dominant |
| dominant | recessive | dominant | dominant |
| dominant | dominant | dominant | dominant |

Because the repeater 500 sets the state of its transmit bit sufficiently early for bits on both sides of the repeater 500, devices on either side of the repeater 500 will see recessive if both sides of the repeater 500 are recessive and see dominant if either side of the repeater 500 is dominant.

Figure 6:
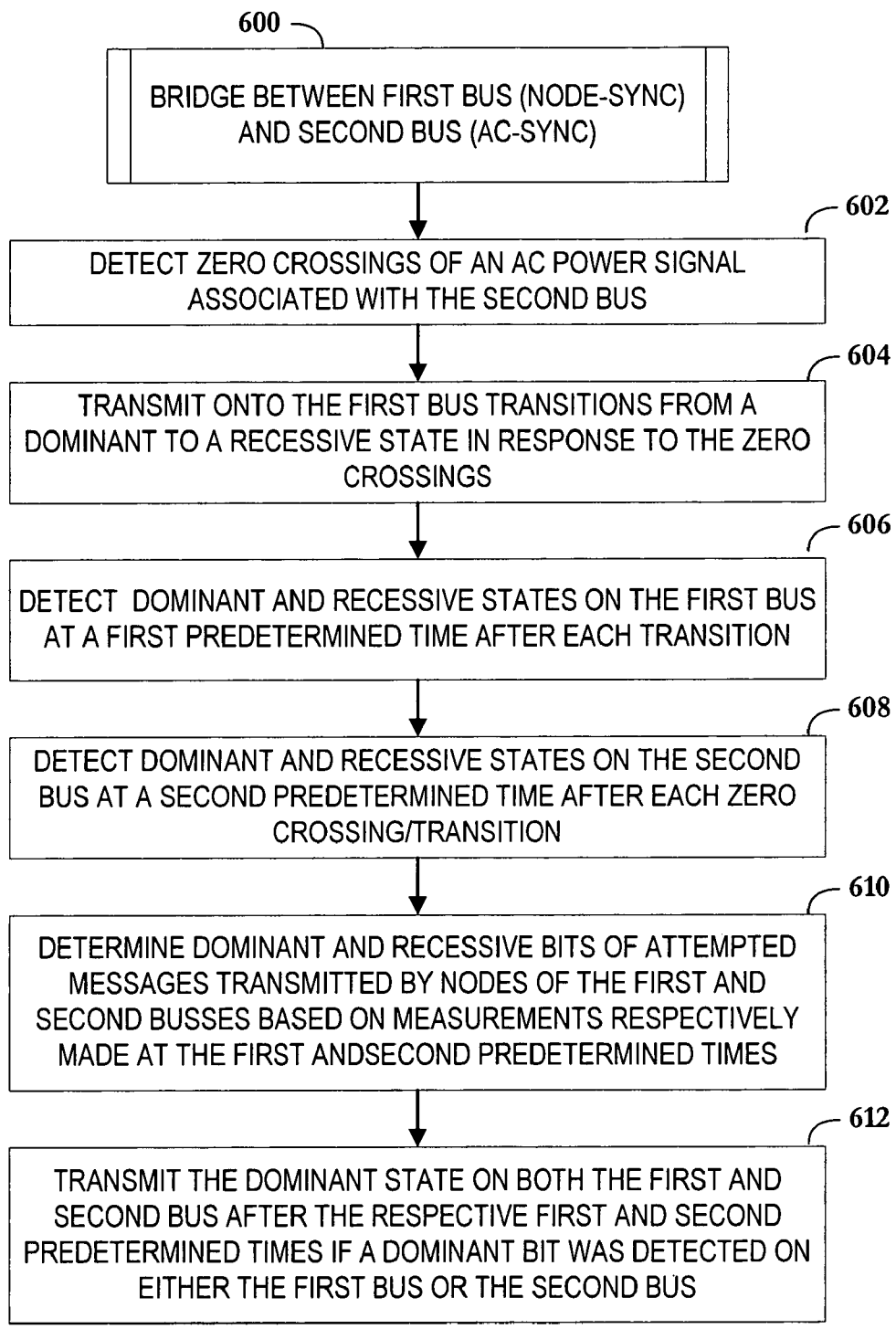
FIG. 6 is a flowchart illustrating a bridging procedure according to an embodiment of the present invention.

In reference now to FIG. 6, a flowchart illustrates a procedure 600 for bridging between busses according to an embodiment of the invention. This procedure 600 is directed to bridging a first bus that uses node-synchronization and a second bus that uses AC-synchronization. The zero crossings of the AC power signal associated with at least the second bus (and possibly the first bus as well) are detected 602. These zero crossings provide a synch signal used for synchronizing the bits on both busses. For the first bus, this involves transmitting 604 a transition onto the first bus from a first state to a second state. In this embodiment, the transition is from dominant to recessive state (CommLow to CommHigh) although other transitions may be possible. These transmissions 604 in effect cause the bridging device to act as Bit Master for the second bus. Because the transitions are transmitted 604 in response to the zero crossings of AC power, this effectively causes the first bus to run at a bit rate proportional to AC power frequency. In the illustrated examples, this slows down the effective bit rate of the first bus, but has no effect on nodes of the second bus.

The bridging device will detect 606 dominant and recessive states of the first bus at a first predetermined time after each transition. Other nodes on the first bus will also detect the dominant and recessive states at a predetermined time after each transition. Generally, however, the bridge will detect 606 these states at an earlier time than specified for the other nodes on the first bus. Similarly, the bridge detects 608 dominant and recessive states of the second bus at a second predetermined time after each transition, which happens earlier than other devices of the second bus will detect the states. Note that the transitions are assumed to occur substantially coincident to the zero crossings of the AC power signal, thus in effect the second predetermined time is measured relative to the zero crossings. By detecting 606, 608 the states of the busses before other devices of the busses, the bridge can apply the correct state to both busses in time for devices of those busses to detect the correct state within the time allotted in the applicable bus specifications.

Based on the measurements 606, 608 of both busses, the bridge determines 610 whether dominant or recessive bits are transmitted on the busses. If a dominant state is detected on either bus, the bridge transmits 612 a dominant state on both busses. The time of transmission 612 will vary based on the particular bus specification (generally the state will be maintained much longer on the second bus), but in either event the transmissions occur after the first and second predetermined times where the states were first detected.

Figure 7:
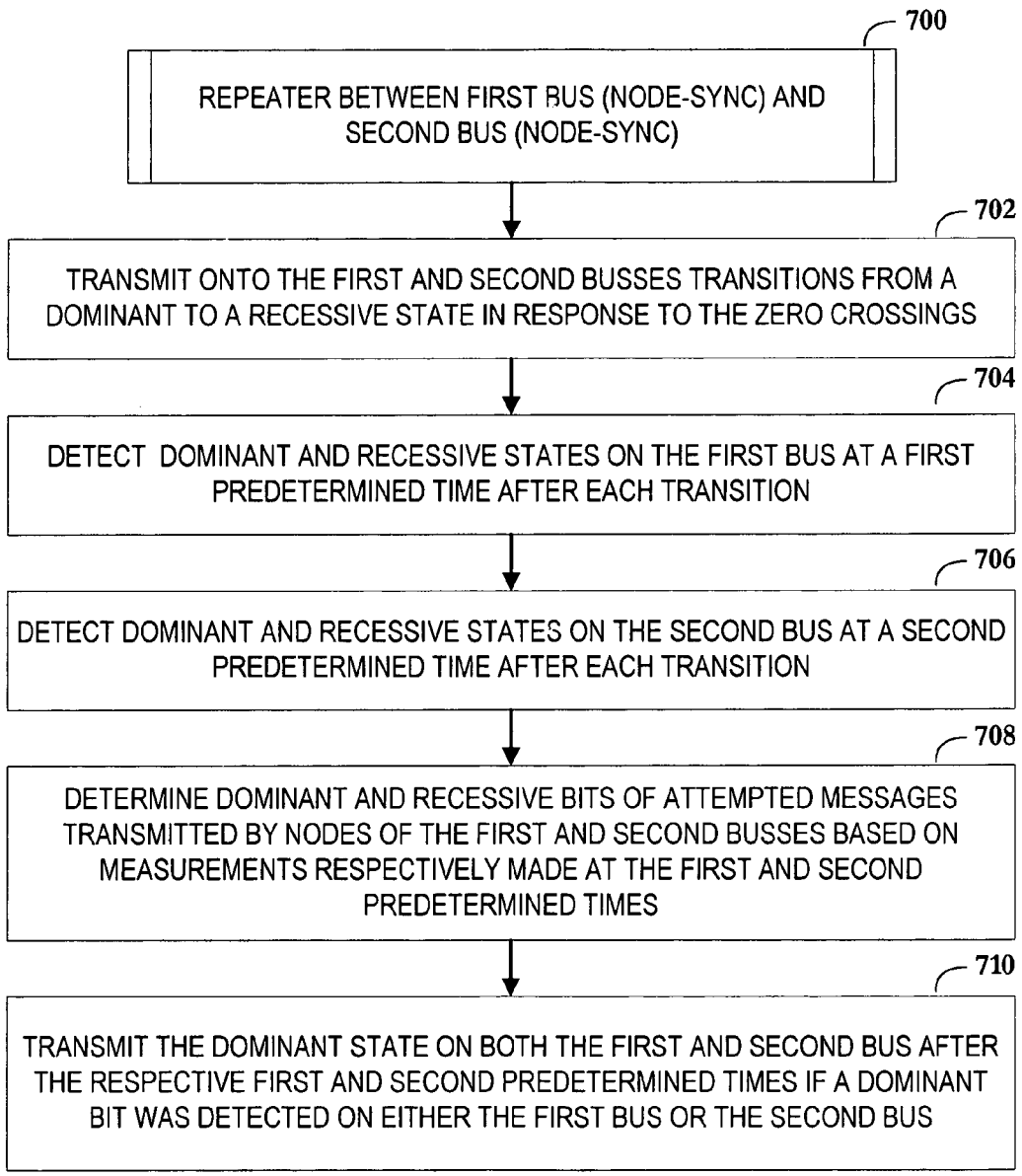
FIG. 7 is a flowchart illustrating a repeater procedure according to an embodiment of the present invention.

In reference now to FIG. 7, a flowchart illustrates a procedure 700 for providing a repeater function between busses according to an embodiment of the invention. In this example, both busses are assumed to be node-synchronized, however similar concepts may be applied to AC-synchronized busses as well. The repeater transmits 702 transitions (e.g., positive edges) onto both busses that signal the start of each bit. The repeater is thus acting as Bit Master on both busses, and the repeater may transmit the transitions using any bit rate allowable within the applicable specification. If the busses were of the AC-synchronized variety, this transmission 702 would not be needed; the repeater would just monitor the AC power signal for zero crossings.

The repeater then detects 704, 706 the dominant or recessive states on the first and second busses at respective first and second predetermined times after the transitions. Assuming both busses comply with compatible specifications, the first and second predetermined times may be substantially the same. The states that are detected 704, 706 are used to determine 708 dominant or recessive bits that are attempted to be transmitted on the busses. If a dominant bit is detected on at least one of the busses, the dominant bit is transmitted 710 on both busses.

Hardware, firmware, software or a combination thereof may be used to perform the various functions and operations described herein of a data processing arrangement utilizing a serial data bus. Articles of manufacture encompassing code to carry out functions associated with the present invention are intended to encompass a computer program that exists permanently or temporarily on any computer-usable medium now known or later developed. From the description provided herein, those skilled in the art will be readily able to combine software created as described with appropriate general purpose or special purpose computer hardware to create a system, apparatus, and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method of communicating between first and second serial data busses, each bus comprising one or more nodes coupled via the respective data bus so that simultaneous transmission on the respective bus of a dominant state by at least one of the nodes and a recessive state by the other nodes results in the dominant state being detectable on the respective bus, the method comprising:
   transmitting onto the first bus transitions from a first state to a second state, wherein the first and second states are complementary states selected from the dominant and recessive states, each of the transitions signaling the start of a bit on the first bus;
   transmitting the transition onto the second bus synchronously with the transmission of transitions onto the first bus;
   detecting dominant and recessive states on the first bus at a first predetermined time after each transition and on the second bus at a second predetermined time after each transition, the states representing respective dominant and recessive bits of attempted messages transmitted by nodes of the first and second busses, wherein the first and second predetermined times are less than a standard predetermined time after the transition that nodes of the first and second busses use to respectively detect the state of the first and second busses; and
   transmitting the dominant state on both the first and second bus after the first and second predetermined times if the dominant state was detected on at least one of the first bus and the second bus at the respective first and second predetermined times.

2. The method of claim 1, further comprising ceasing transmission of bits onto the first and second busses by any of nodes of the first and second busses that were transmitting a recessive bit after the respective first and second predetermined times and detected a dominant bit after the respective first and second predetermined times.

3. A processor-readable medium, comprising:
   a program storage medium configured with instructions for use by a device to perform the operations of claim 1.

4. The method of claim 1, wherein a device transmitting the transitions on to the first and second busses is established as a bit master on both the first and second busses, wherein a node of the first or second busses is arbitrarily selected as the bit master of the respective bus if the transmission is not detected for a predefined time period on the respective bus.

5. A method of communicating between first and second serial data busses, each bus comprising one or more nodes coupled via the respective data bus so that simultaneous transmission on the respective bus of a dominant state by at least one of the nodes and a recessive state by the other nodes results in the dominant state being detectable on the respective bus, the method comprising:
   transmitting onto the first bus transitions from a first state to a second state, wherein the first and second states are complementary states selected from the dominant and recessive states, each of the transitions signaling the start of a bit on the first bus;
   detecting dominant and recessive states on the first bus at a first predetermined time after each transition and on the second bus at a second predetermined time after each transition, the states representing respective dominant and recessive bits of attempted messages transmitted by nodes of the first and second busses;
   detecting a synchronization signal of the second bus from an alternating current power signal of the second bus;
   transmitting the dominant state on both the first and second bus after the first and second predetermined times if the dominant state was detected on at least one of the first bus and the second bus at the respective first and second predetermined times; and
   wherein the transmission of the transition onto the first bus is in response to the synchronization signal of the second bus and causes bits to be transmitted onto the first bus at a slower rate than a maximum bit rate of nodes of the first bus.

6. A processor-readable medium, comprising a program storage medium configured with instructions for use by a device to perform the operations of claim 5.

7. The method of claim 5, wherein detecting the synchronization signal of the second bus from an alternating current power signal of the second bus comprises detecting the synchronization signal based on zero crossings of a voltage signal of the alternating current power line.

8. The method of claim 5, wherein a device transmitting the transitions on to the first bus is established as a bit master on the first bus, wherein a node of the first bus is arbitrarily selected as the bit master if the transmission is not detected for a predefined time period on the first bus.

9. An apparatus operable in a data processing arrangement that includes first and second serial data busses, each bus having one or more nodes coupled via the respective data bus so that simultaneous transmission on the respective bus of a dominant state by at least one of the nodes and a recessive state by the other nodes results in the dominant state being detectable on the respective bus, the apparatus comprising:
   a first transceiver coupled to the first bus and capable of transmitting and receiving the dominant and recessive states via the first bus;
   a second transceiver coupled to the second bus and capable of transmitting and receiving the dominant and recessive states via the second bus;
   a synchronization detector coupled to an alternating current power line of the second bus, the synchronization detector providing a synchronization signal proportional to the frequency of the alternating current power line, the synchronization signal signaling the beginning of bit transmissions onto the second bus;
   a processor coupled to the first and second transceivers and the synchronization detector, the processor operable via instructions to cause the apparatus to,
      transmit, via the first transceiver, repeated transitions from a first state to a second state on the first bus in response to the synchronization signal of the second bus, wherein the first and second states are complementary states selected from the dominant and recessive states, and wherein the transmission of the transition onto the first bus in response to the synchronization signal of the second bus causes bits to be transmitted onto the first bus at a slower rate than a maximum bit rate of nodes of the first bus;

detect via the first transceiver dominant and recessive states on the first bus at a first predetermined time after each transition;

detect via the second transceiver dominant and recessive states on the second bus at a second predetermined time after each transition; and transmit the dominant state on both the first and second bus after the first and second predetermined times if the dominant state was detected on either the first bus or the second bus at respective first and second predetermined times.

10. The apparatus of claim 9, wherein the synchronization detector provides the synchronization signal based on zero crossings of a voltage signal of the alternating current power line.

11. The apparatus of claim 9, wherein transmitting the transitions on to the first bus establishes the apparatus as a bit master on the first bus, wherein a node of the first bus is arbitrarily selected as the bit master if the transmission is not detected for a predefined time period on the first bus.

12. The apparatus of claim 9, wherein the first and second busses comprise thermostat wires.

13. The apparatus of claim 12, wherein transmitting the transitions on to the first and second busses establishes the apparatus as a bit master on the first and second busses, wherein a node of the first or second busses is arbitrarily selected as the bit master of the respective bus if the transmission is not detected for a predefined time period on the respective bus.

14. An apparatus operable in a data processing arrangement that includes first and second serial data busses, each bus having one or more nodes coupled via the respective data bus so that simultaneous transmission on the respective bus of a dominant state by at least one of the nodes and a recessive state by the other nodes results in the dominant state being detectable on the respective bus, the apparatus comprising:

a first transceiver coupled to the first bus and capable of transmitting and receiving the dominant and recessive states via the first bus;

a second transceiver coupled to the second bus and capable of transmitting and receiving the dominant and recessive states via the second bus;

a processor coupled to the first and second transceivers and operable via instructions to cause the apparatus to, transmit, via the first transceiver, repeated transitions from a first state to a second state on the first bus, wherein the first and second states are complementary states selected from the dominant and recessive states;

detect via the first transceiver dominant and recessive states on the first bus at a first predetermined time after each transition;

detect via the second transceiver dominant and recessive states on the second bus at a second predetermined time after each transition; and transmit the dominant state on both the first and second bus after the first and second predetermined times if the dominant state was detected on either the first bus or the second bus at respective first and second predetermined times, wherein the first predetermined time is less than a predetermined time after the transition that nodes of the first bus use to detect the state of the first bus.

15. The apparatus of claim 14, wherein the second predetermined time is less than a predetermined time after the transition that nodes of the second bus use to detect the state of the second bus.

16. The apparatus of claim 14, wherein processor causes the second transceiver to repeatedly transmit the transitions on the second bus synchronously with the transmission of the transitions onto the first bus.

17. The apparatus of claim 14, wherein the processor further causes the apparatus to transmit, via the second transceiver, the repeated transitions from the first state to the second state on the second bus.

18. The apparatus of claim 14, wherein the first and second busses comprise thermostat wires.

* * * * *